(12) United States Patent
Hirata et al.

(10) Patent No.: US 7,320,352 B2
(45) Date of Patent: Jan. 22, 2008

(54) SPLIT RIM FOR PNEUMATIC TIRE

(75) Inventors: Yoshiaki Hirata, Kodaira (JP); Keigo Kikuchi, Kodaira (JP); Akio Oobayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 266 days.

(21) Appl. No.: 10/504,574

(22) PCT Filed: Feb. 18, 2003

(86) PCT No.: PCT/JP03/01738

§ 371 (c)(1),
(2), (4) Date: Apr. 13, 2005

(87) PCT Pub. No.: WO03/071250

PCT Pub. Date: Aug. 28, 2003

(65) Prior Publication Data

US 2005/0173039 A1    Aug. 11, 2005

(30) Foreign Application Priority Data

Feb. 20, 2002    (JP)    ............................. 2002-042631

(51) Int. Cl.
*B60C 25/00*    (2006.01)

(52) U.S. Cl. .......................... 157/18; 157/1.35; 73/146

(58) Field of Classification Search ............... 157/1.35, 157/14–21; 269/48.1; 279/2.1–2.14; 403/31; 73/146; 301/35.2; 152/396; 29/894.31
See application file for complete search history.

(56) References Cited

U.S. PATENT DOCUMENTS

| | | | | | |
|---|---|---|---|---|---|
| 4,023,407 | A | * | 5/1977 | Vanderzee | .................... 73/146 |
| 5,257,561 | A | * | 11/1993 | Folta | ............................ 82/165 |
| 5,259,242 | A | * | 11/1993 | Folta | ............................ 73/146 |

FOREIGN PATENT DOCUMENTS

| JP | U 57-54004 | 3/1982 |
|---|---|---|
| JP | A 7-174658 | 7/1995 |

* cited by examiner

Primary Examiner—D. S. Meislin
(74) Attorney, Agent, or Firm—Oliff & Berridge, PLC

(57) ABSTRACT

A split rim for pneumatic tire includes a disk part having a seat portion allowing a corresponding tire bead part to be seated at the radial outer end. First and second pieces are connected to the disk part and have cylindrical parts coaxial with the disk parts. The cylindrical part of the second piece can be inserted into the cylindrical part of the first piece. The cylindrical parts of the first and second pieces overlap with each other in the inserted state and are connected to each other by a fastening mechanism. The fastening mechanism includes a group of claws formed on the inner circumference of the first piece cylindrical part and a group of claws formed on the outer circumference of the second piece cylindrical part.

5 Claims, 3 Drawing Sheets

SPLIT RIM FOR PNEUMATIC TIRE

BACKGROUND ART

1. Field of the Invention

The present invention relates to a split rim for temporarily attaching a pneumatic tire upon inspection or the like thereof.

2. Prior Art

Upon inspection or the like of a pneumatic tire, a split rim provided with first and second pieces are used. The first and the second pieces are attached, at a rim assembly station, to first and second bead portions of a tire to be inspected, respectively, and are then fastened to each other to form a tire/rim assembly. The assembly is conveyed to a tire inspecting machine installed at an inspection station, and connected to a shaft of the tire inspecting machine and given required inspection while being rotated integrally with the shaft.

Such a split rim has been used to attach a pneumatic tire or a solid tire to an industrial vehicle or the like. However, since both pieces are fastened to each other by holding inward flanges formed at inner ends in the axial direction of the first and the second pieces, respectively, with bolts and nuts, there arises a problem as follows. That is to say, when used for inspection or the like of the pneumatic tire, only a pneumatic tire with a predetermined inter-bead distance (so-called "foot breadth") can be attached. As a result, various types of rims must be prepared and stored according to the types of pneumatic tire with different inter-bead distance, thereby giving rise to a problem that work becomes time-consuming, a large storage place is needed and costs are increased.

DISCLOSURE OF THE INVENTION

It is an object of the present invention to provide a split rim to which a pneumatic tire with a different inter-bead distance can be easily attached.

To this end, the split rim for a pneumatic tire according to the present invention comprises a disk part having a seat portion allowing one of bead portions of a pneumatic tire to be seated at an outer end in the radial direction, and first and second pieces having cylindrical parts coaxially connected to the disk part, respectively, in which the cylindrical parts of the first and the second pieces can be inserted into each other, and a fastening means for fastening the cylindrical parts of the first and the second pieces overlapped in the inserted state to each other at the overlapped region.

According to the present invention, since the cylindrical part of the second piece is inserted into the cylindrical part of the first piece in the rim and both pieces are combined with each other by fastening the overlapped region of these cylindrical parts by the fastening means, the interval of the seat portions in the first and the second pieces can be adjusted appropriately according to the inter-bead distance of a tire to be attached, only by changing its insertion amount or an overlapped amount. As a result, only by preparing at least a pair of rims, plural types of pneumatic tires with different inter-bead distance can be easily attached, by which work is facilitated and costs can be reduced.

The rim according to the present invention is further provided with an expanding means for expanding the cylindrical part of the second piece in the overlapped region toward the outside in the radial direction in order to surely improve concentricity between both in the combined state of the first and the second pieces, and the cylindrical parts of the first piece and the second piece can be brought into close contact constitution at the overlapped region.

In order to enable easy improvement of the concentricity with a simple structure, the expanding means can be so constituted that it is provided with a guide shaft coaxial with the center shaft of the cylindrical part of the first piece, a slider fitted to the outside of the guide shaft movably in the axial direction and having a tapered surface made of a part of a conical surface on the outer circumference and an enlarging member with the inner circumference which can be engaged with the tapered surface of the slider and the outer circumference which can be engaged with the inner circumference of the cylindrical part of the second piece, respectively, and that the cylindrical part of the second piece at the overlapped region can be expanded radially outward, by moving the slider in the axial direction and by enlarging the enlarging member outward in the radial direction by a wedge action of the tapered surface.

The fastening means is provided with a first fastening mechanism in which a group of claws made of a plurality of claws formed on the inner circumference of the cylindrical part of the first piece and arranged with an equiangular interval in the circumferential direction are provided in plural stages in the axial direction separated by an equal distance and a second fastening mechanism in which a group of claws made of a plurality of claws formed on the outer circumference of the cylindrical part of the second piece and separated by an equal angle from the claw in the circumferential direction are provided in plural stages in the axial direction separated by the equal distance as above, and when the cylindrical part of the second piece is inserted into the cylindrical part of the first piece, after the claws of the second fastening mechanism pass between the claws of the first fastening mechanism, the first and the second pieces are relatively rotated, and by having the claws of the first and the second fastening mechanisms overlapped with each other, such constitution can be achieved that the cylindrical parts of the first and the second pieces are fastened. In this case, the first and the second pieces can be surely fastened at a desired fastening position with a simple structure by displacing them with respect to each other by a constant pitch in the axial direction.

Among the first and the second pieces, a shallow recess to be fitted to a claw of the piece to be the upper side may be formed on the lower face of a claw of the piece to be the lower side when they are combined with each other. Alternatively, among the first and the second pieces, a shallow recess to be fitted to a claw of the piece to be the lower side may be formed on the upper face of a claw of the piece to be the upper side when they are combined with each other. In either case, when a relative rotational force acts between the first and the second pieces or the first and the second pieces combined with each other are conveyed in the state where a pneumatic tire is not attached, removal of fastening between the first and the second pieces can be prevented.

By closing the opening on the side separated from the overlapped region of the cylindrical parts of the first and the second pieces with a closure lid, leakage of internal pressure of a pneumatic tire can be effectively prevented.

In this case, if it is so constituted that a valve which can be opened/closed is provided at the closure lid of the first or the second piece and the internal pressure is supplied to the tire by opening the valve only when a rim to which a pneumatic tire is attached is conveyed to a predetermined position, the valve is closed when the rim is separated from the predetermined position, and the tire/rim assembly can be easily conveyed in the state where the tire is filled with the internal pressure.

Among the first and the second pieces, it can be so constituted that an inclined surface tapered downward is provided on the outer circumference of the cylindrical part of the piece to be the lower side when combined with each other so that positioning is achieved using the inclined surface when a rim to which a pneumatic tire is attached is loaded on a predetermined position. In this case, the positioning accuracy when the rim is loaded at the predetermined position can be further improved.

BRIEF DESCRIPTION OF THE DRAWINGS

The present invention will be further described referring to a preferred embodiment shown in the attached drawings.

BEST MODE FOR CARRYING OUT THE INVENTION

Figure 1:
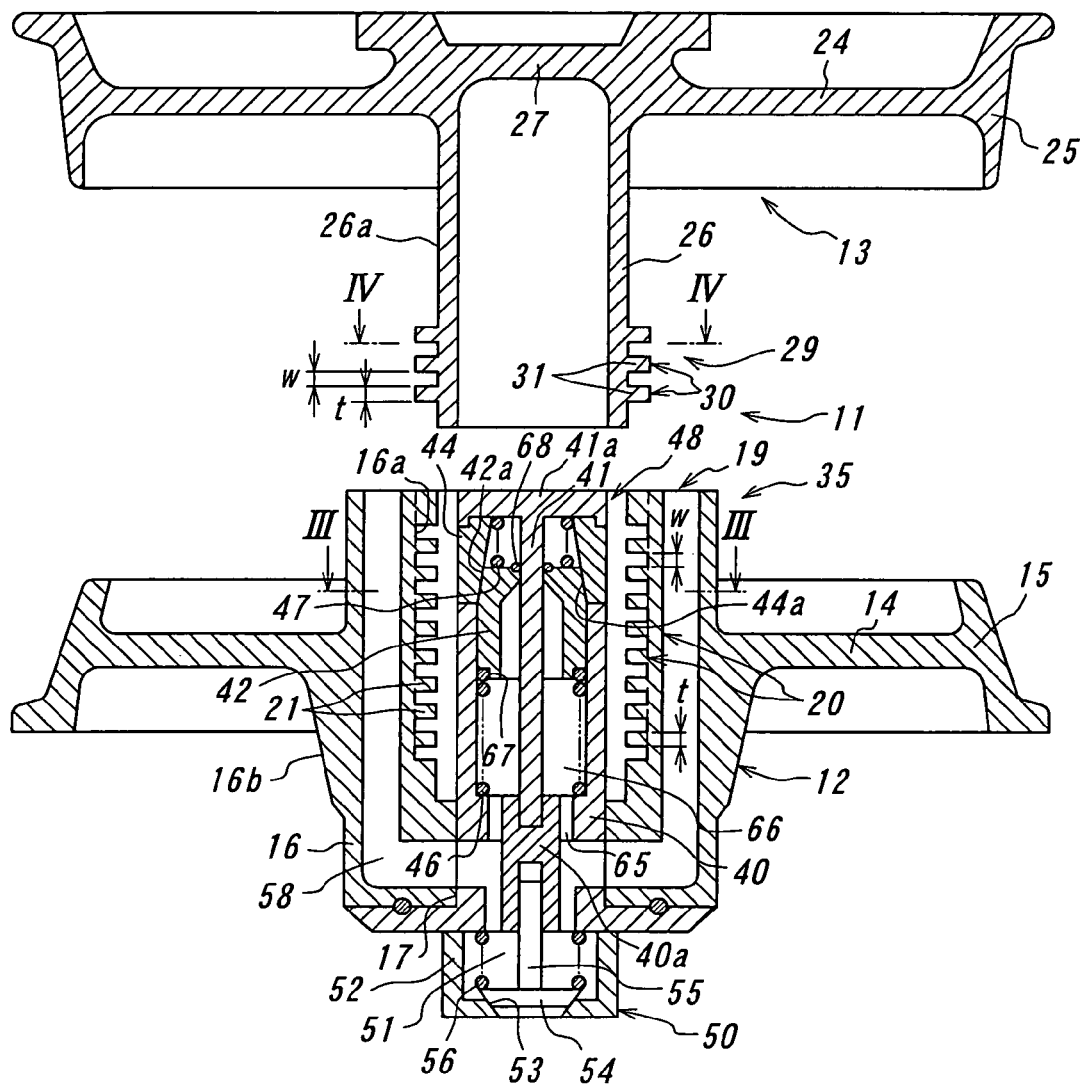
FIG. 1 is a longitudinal sectional view showing a split rim according to an embodiment of the present invention in the state where the first and the second pieces are separated.
Figure 2:
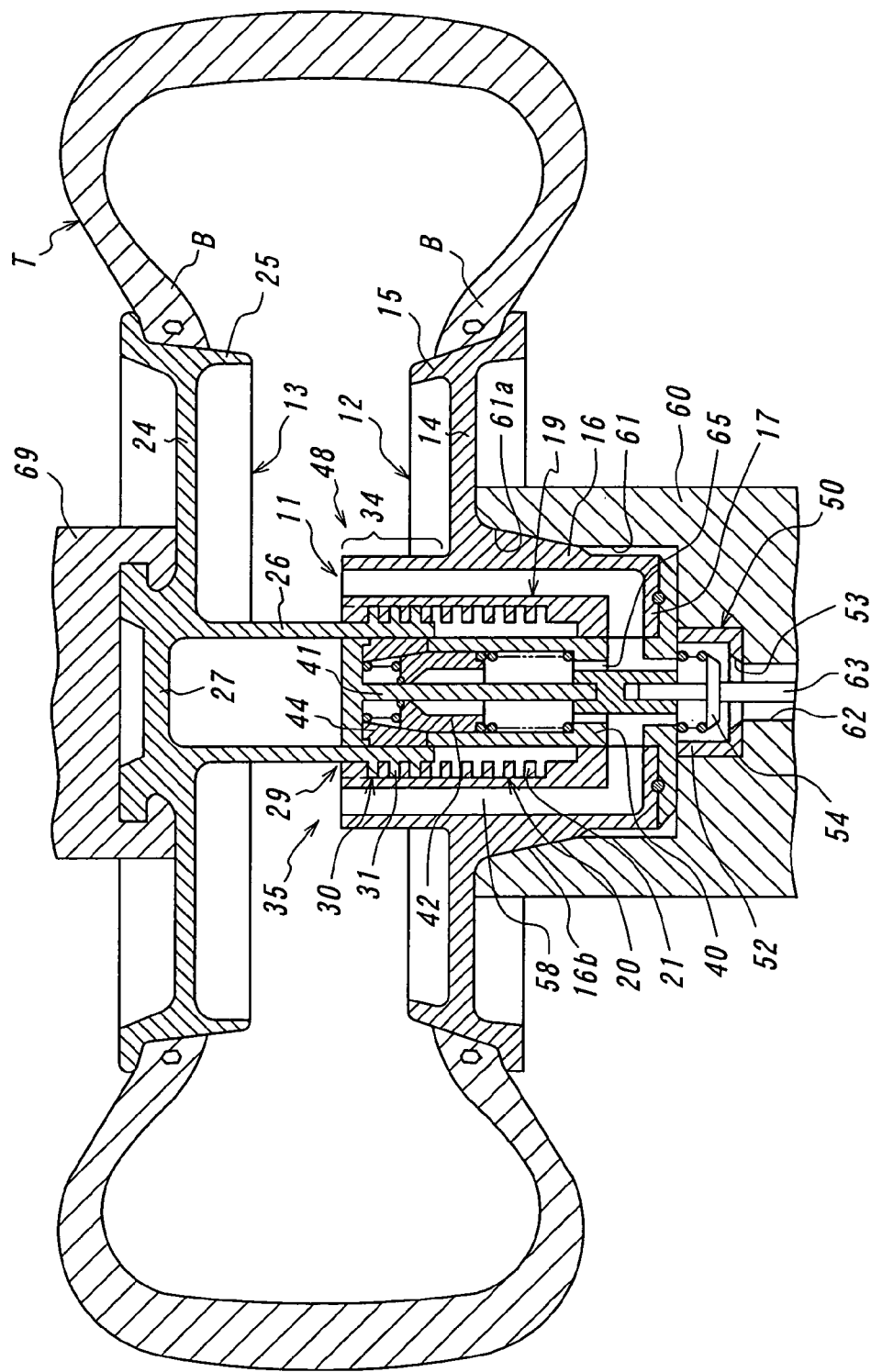
FIG. 2 is a longitudinal sectional view showing the rim in FIG. 1 in the state where the first and the second pieces are combined and a pneumatic tire is attached.

In FIGS. 1, 2, reference numeral 11 represents a split rim which can temporarily attach a pneumatic tire T at inspection or the like of the pneumatic tire T. The rim 11 is comprised of a first piece 12 located on the lower side and a second piece 13 located on the upper side. The first piece 12 has a disk part 14 in the flange state, for example, and at an outer end in the radial direction of this disk part 14, a seat portion 15 on which one bead portion B of the tire T, the bead portion B on the lower side in this embodiment, is seated is provided. Reference numeral 16 represents a cylindrical part coaxial with the disk part 14. The center part of the cylindrical part 16 is integrally connected to an inner end in the radial direction of the disk part 14. An opening at an upper end of the cylindrical part 16 is opened, while an opening at a lower end is stopped by a closure lid 17.

Figure 3:
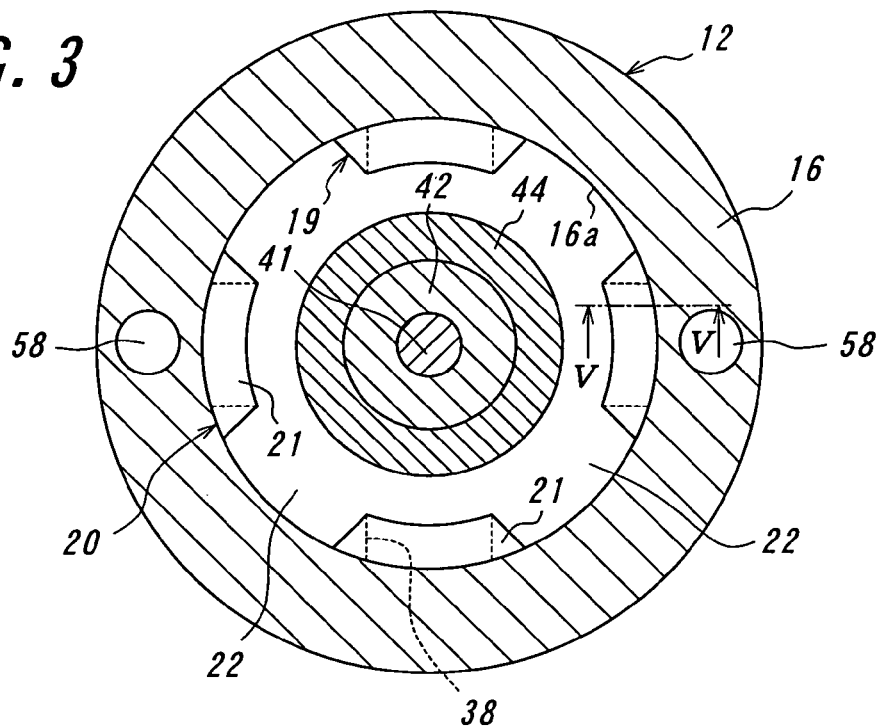
FIG. 3 is a sectional view as seen from the direction of arrow III-III in FIG. 1.
Figure 4:
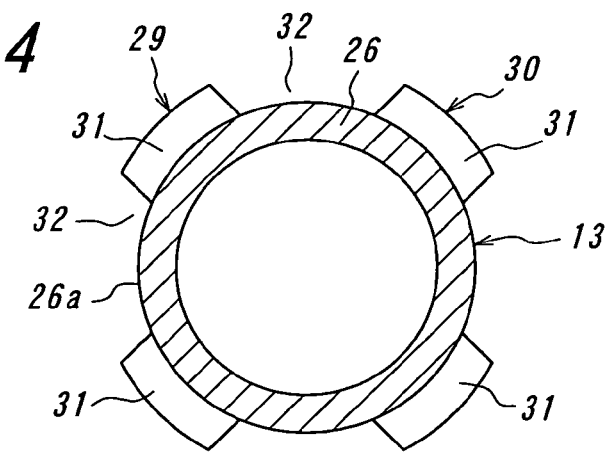
FIG. 4 is a sectional view as seen from the direction of arrow IV-IV in FIG. 1.
Figure 5:
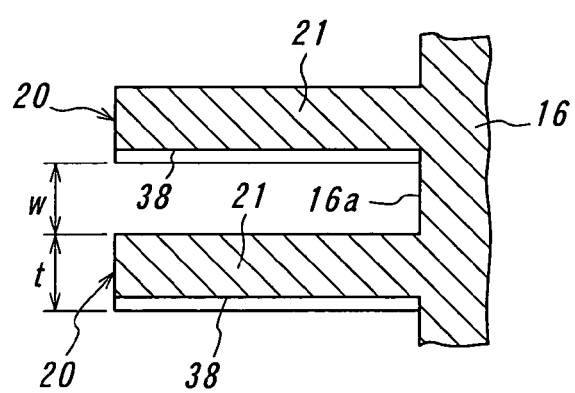
FIG. 5 is a sectional view as seen from the direction of arrow V-V in FIG. 3.

In FIGS. 1 through 3, reference numeral 19 represents a first fastening mechanism provided on an inner circumference 16a of the cylindrical part 16. The first fastening mechanism 19 is comprised of a claw group 20 in plural stages (8 stages in the shown embodiment) separated by an equal distance in the axial direction. A width w of a clearance formed between these claw groups 20 is slightly smaller than a thickness t of a claw 31 of a second piece 13, which will be described later. Each of the claw groups 20 is arranged at an equiangular interval and constituted of a claw 21 presenting a plurality of arcs projecting toward inside in the radial direction, and a clearance 22 in almost the same shape as the claw 21 is formed between adjacent two claws 21.

In the meantime, the second piece 13 also has a disk part 24 in the flange state, for example, and at an outer end in the radial direction of this disk part 24, there is provided a seat portion 25 on which the other bead portion B of the tire T, i.e., the bead portion B on the upper side in this embodiment, is seated. Reference numeral 26 represents a cylindrical part coaxial with the disk part 24. The upper end of the cylindrical part 26 is integrally connected to an inner end in the radial direction of the disk part 24. An opening at a lower end of the cylindrical part 26 is opened, while an opening at an upper end is stopped by a closure lid 27.

Reference numeral 29 represents a second fastening mechanism provided on an outer circumference 26a on a lower end of the cylindrical part 26. The second fastening mechanism 29 is comprised of a claw group 30 in plural stages which are fewer than the claw group 20, i.e., three stages in the embodiment, separated by an equal distance from the claw group 20 in the axial direction. A width "w" of a clearance formed between these claw groups 30 is slightly smaller than a thickness "t" of a claw 21 of a first piece 12. Each of the claw groups 30 is arranged at an equiangular interval in the circumferential direction and constituted of a plurality of claws, four claws 31 in the state of four arcs projecting toward outside in the radial direction, and a clearance 32 in almost the same shape as the claw 31 is formed between adjacent two claws 31.

When the first piece 12 and the second piece 13 are to be combined, the second piece 13 in the coaxial relation with the first piece 12 is lowered immediately above the first piece 12, and the cylindrical part 26 is inserted into the cylindrical part 16. At this time, since the claw 31 of the second fastening mechanism 29 passes through the clearance 22 formed between the claws 21 of the first fastening mechanism 19, the claws 21, 31 do not interfere with each other, but the insertion is carried out smoothly.

When the cylindrical part 26 is inserted into the cylindrical part 16 by a predetermined amount, the second piece 13 is relatively rotated only by 45 degrees with respect to the first piece 12, and at this time, the claws 21, 41 of the first and the second fastening mechanisms 19, 29 are overlapped with each other in the axial direction, and the first and the second pieces 12, 13 are fastened at the cylindrical parts 16, 26.

The first fastening mechanism 19 and the second fastening mechanism 29, mentioned above, constitute as a whole a fastening means 35 for fastening the cylindrical parts 16, 26 of the first and the second piece 12, 13 overlapped through insertion as above at an overlapped region 34. And if the fastening means 35 is constituted by the first fastening mechanism 19 made of plural stages of the claw groups 20 and the second fastening mechanism 29 made of plural stages of the claw groups 30 as mentioned above, it is possible to surely fasten the first and the second pieces 12, 13 to each other with a simple structure at a desired fastening position by displacing them with respect to each other by a constant pitch in the axial direction.

In FIGS. 1 through 5, reference numeral 38 represents a shallow recess with the depth of about 0.5 mm, for example, formed on a lower face of each of the claws 21 of a piece to be the lower side when combined with each other as mentioned above, the first piece 12 in this embodiment. These shallow recesses 38 are in the same shape as the claw 31 of the piece to be the upper side, the second piece 13 in this embodiment. And after the claws 21, 31 of the first and the second fastening mechanisms 19, 29 are overlapped with each other in the axial direction as mentioned above, when the second piece 13 is moved in the direction pulling out of the first piece 12, the upper end of the claw 31 is engaged with the shallow recess 38 of the claw 21, respectively.

When the claw 31 is fitted to the shallow recess 38 in this way, relative rotation of the first and the second pieces 12, 13 can be prevented, and if a relative rotational force acts on the first piece 12 and the second piece 13 for inspection of the pneumatic tire T, or when the first and the second pieces 12, 13 combined with each other in the state where the tire T is not attached are conveyed, removal of fastening between both the pieces 12, 13 can be prevented.

Also, when the lower end opening of the cylindrical part 16 on the side separated from the overlapped region 34 is stopped by the closure lid 17 as mentioned above, while the upper end opening of the cylinder part 26 on the side separated from the overlapped region 34 is stopped by the closure lid 27, even if the internal pressure filled in the pneumatic tire T leaks into the cylinder parts 16, 26, the closure lids 17, 27 effectively prevent leakage of the internal pressure to the outside, and the internal pressure of the tire T can be held constant easily.

In FIGS. 1 through 3, reference numeral 40 represents a holder which is housed in the cylindrical part 16 and is coaxial with the cylindrical part 16. The holder 40 is in the cylindrical state with a bottom, and its bottom wall part 40a (lower end) is inserted and fixed to the closure lid 17. Also, the outer diameter of an upper part of this holder 40 has the same diameter as the inner diameter of the cylindrical part 26, and as a result, when the cylindrical part 26 is inserted into the cylindrical part 16, the outer circumference of the upper part of the holder 40 is engaged with the inner circumference of the cylindrical part 26.

Reference numeral 41 represents a guide shaft inserted into the holder 40 and its lower end is fixed to the bottom wall part 40a. The guide shaft 41 is coaxial as the center shaft of the cylindrical part 16 of the first piece 12. Also, the guide shaft 41 has on its upper end a flange part 41a in the disk state with the same diameter as the upper part of the holder 40, and the outer circumference of this flange part 41a is engaged with the inner circumference of the cylindrical part 26 when the cylindrical part 26 is inserted into the cylindrical part 16. Reference numeral 42 represents a slider fitted movably to the axial direction on the outside of the guide shaft 41. The outer circumference of the upper end of the slider 42 is a tapered surface 42a made of a part of a conical surface tapered upward.

Reference numeral 44 represents an enlarging member in almost the cylindrical state split in plural in the circumferential direction, and the upper end of this enlarging member 44 is locked by the flange part 41a of the guide shaft 41. Here, the outer diameter of this enlarging member 44 is usually the same as the inner diameter of the cylindrical part 26, and when the cylindrical part 26 is inserted into the cylindrical part 16, the outer diameter of the enlarging member 44 is engaged with the inner circumference of the cylindrical part 26. In the meantime, the inner circumference of the enlarging member 44 is constituted by a tapered surface 44a made of a part of a conical surface tapered upward with the same gradient as that of the tapered surface 42a of the slider 42, and the tapered surface 42a of the slider 42 can be engaged with this tapered surface 44a.

And in the state where the cylindrical part 26 is inserted in the cylindrical part 16 as mentioned above, when the slider 42 is moved in the axial direction, upward in this embodiment, the enlarging member 44 is enlarged outward in the radial direction by wedge action of the tapered surfaces 42a, 44a, and the cylindrical part 26 of the second piece 13 at the overlapped region 34 is pushed by the enlarging member 44 and is slightly expanded radially outward, by which the outer circumference of the cylindrical part 26, more particularly the claw 31, is brought into close contact with the inner circumference 16a of the cylindrical part 16.

Reference numeral 46 represents a holding spring with a small spring constant interposed between the slider 42 and the bottom wall part 40a of the holder 40 for regulating movement of the slider 42 downward from a predetermined position. Also, reference numeral 47 represents a return spring with a large spring constant interposed between the slider 42 and the flange part 41a of the guide shaft 41 for pushing back the slider 42 downward when an upward moving force is not applied to the slider 42 any more.

The guide shaft 41, the slider 42, the enlarging member 44, the holding spring 46 and the return spring 47 mentioned above as a whole constitute an expanding means 48 for expanding the cylindrical part 26 of the second piece 13 at the overlapped region 34 to outside in the radial direction and bringing the cylindrical parts 16, 26 of the first and the second pieces 12, 13 into close contact with each other at the overlapped region 34.

And if such an expanding means 48 is provided, when the cylindrical part 26 is inserted into the cylindrical part 16 and the first and the second pieces 12, 13 are combined with each other, the concentricity between both the pieces 12, 13 can be surely improved. Also, if the expanding means 48 is constituted by the guide shaft 41, the slider 42, the enlarging member 44, the holding spring 46 and the return spring 47 as mentioned above, the concentricity can be easily improved with a simple structure.

Reference numeral 50 represents a piece to be the lower side when combined with each other, a valve which can be opened/closed and is mounted on the closure lid 17 of the first piece 12 through the bottom wall part 40a of the holder 40 in this embodiment. The valve 50 has a valve case 52 with a spring chamber 51 formed inside, and this spring chamber 51 is made to communicate to the outside through a through hole 53 formed on a lower end of the valve case 52 and having a valve seat face.

Reference numeral 54 represents a valve body with a stem 55 slidably inserted in the bottom wall part 40a of the holder 40. The valve body 54 closes the valve 50 when it is pressed by the spring 56 onto the valve seat surface of the through hole 53, while it opens the valve 50 when separated from the through hole 53. The valve case 52, the valve body 54 and the spring 56 mentioned above constitute as a whole the valve 50 mentioned above.

Reference numeral 58 represents a passage formed in the cylindrical part 16, the holder 40. One end of the passage 58 communicates to the spring chamber 51, while the other end is opened at the upper end face of the cylindrical part 16. Reference numeral 60 represents a supporting member such as a spindle, and on an upper face of this supporting member 60, a piece to be the lower side when combined with each other, an insertion hole 61 into which the cylindrical part 16 lower than the disk part 14 of the first piece 12 is inserted in this embodiment, is formed.

On the inner circumference on an upper side of the through hole 61, an inclined surface 61a made of a part of a conical surface tapered downward is formed, while on the outer circumference of the cylindrical part 16 lower than the disk part 14, an inclined surface 16b made of a part of a conical surface tapered downward with the same gradient as the inclined surface 61a is formed. As a result, when the rim 11 to which the tire T is attached is loaded on the supporting member 60 and the cylindrical part 16 is inserted into the insertion hole 61, the supporting member 60 and the rim 11 are positioned with high accuracy by these inclined surfaces 16b, 61a.

Here, the supporting member 60 mentioned above is installed at a predetermined position such as a rim assembly station, a rim disassembly station and an inspection station, for example, and constitutes a part of a rim assembling device, an inspecting device, a rim disassembling device, etc. provided at these stations. Also, an internal pressure passage 62 connected to a fluid source, not shown, is opened on a bottom surface of the above-mentioned insertion hole 61, and an opening/closing rod 63 which can press the valve body 54 is supported capable of elevation.

And when the rim 11 to which the tire T is attached is loaded on the supporting member 60, the opening/closing rod 63 is raised to push up the valve body 54 and open the valve 50. By this, the internal pressure is supplied from the fluid source through the internal pressure passage 62, the through hole 53, the spring chamber 51 and the passage 58 into the tire T, or the internal pressure in the tire T is exhausted through the passage 58 and the internal pressure passage 62 or the like.

In the meantime, when the rim 11 to which the tire T is attached is removed from the supporting member 60, the valve body 54 is pressed onto the through hole 53 by an energizing force of the spring 56 to close the valve 50, and the internal pressure in the tire T is kept in the filled state and leakage to the outside is prevented.

If the valve 50 which can be opened/closed is provided at the first piece 12 located on the lower side and the internal pressure is supplied to the tire T by opening the valve 50 only when the rim 11 to which the tire T is attached is loaded on the supporting member 60 in this way, the valve 50 is closed when the rim 11 is separated from the supporting member 60, and the rim 11 and the tire T can be conveyed easily in the state where the internal pressure is filled in the tire T.

Reference numeral 65 represents a branch passage branching from the middle of the passage 58 and communicating to a spring chamber 66 formed between the holder 40 and the slider 42. Into the spring chamber 66, an isobaric internal pressure is supplied through the branch passage 65 when the internal pressure is supplied into the tire T as mentioned above so as to apply an upward moving force (fluid force) to the slider 42. Reference numerals 67, 68 represent O rings arranged between the holder 40 and the slider 42 and between the guide shaft 41 and the slider 42 for sealing them. Also, reference numeral 69 represents a gripping mechanism of a conveying device for gripping an upper piece at conveyance of the above-mentioned rim 11 and the tire T, the second piece 13 in this embodiment.

The operation of the above-mentioned embodiment will now be explained below.

It is assumed that the first piece 12 is now loaded on the supporting member 60 of a rim assembling device installed at the rim assembly station, and its cylindrical part 16 is inserted into the insertion hole 61. At this time, since the opening/closing rod 63 has been lowered, the valve 50 is closed, and a positioning accuracy between the supporting member 60 and the rim 11 is high due to the inclined surfaces 16b, 61a. Next, the tire T is carried into the rim assembly station by a conveying device and fitted to the outside of the first piece 12 in the laterally loaded state. By this, the bead portion B on the lower side of the tire T is seated to the seat portion 15 of the first piece 12.

Next, the second piece 13 which is standing by immediately above the first piece 12 is lowered by the gripping mechanism 69 of the conveying device, and its cylindrical part 26 is inserted into the cylindrical part 16 of the first piece 12, but at this time, since the claw 31 of the second fastening mechanism 29 passes through the clearance 22 formed between the claws 21 of the first fastening mechanism 19, the claws 21, 31 do not interfere with each other.

And when the cylindrical part 26 is inserted into the cylindrical part 16 by a predetermined amount, the second piece 13 is rotated by the gripping mechanism 69 only by 45 degrees with respect to the first piece 12. By this, the claws 21, 31 of the first and the second fastening mechanisms 19, 29 are overlapped with each other in the axial direction, the cylindrical parts 16, 26 are fastened together, and the first and the second pieces 12, 13 are combined. At this time, the upper bead portion B is seated to the seat portion 25 of the second piece 13.

Here, if the insertion amount (overlapping amount) is changed so that the claw group 30 is to be engaged with another claw group 20, the distance between the seat portions 15, 25 of the first and the second pieces 12, 13 can be adjusted according to the distance between beads (foot breadth) of the tire T to be attached. As a result, only by preparing at least 1 pair of the rims 11, the tire T can be easily attached even if the inter-bead distance of the tire T is different, by which work is simplified and manufacturing costs are reduced.

Next, the opening/closing rod 63 is raised to push up the valve body 54 and to open the valve 50. By this, the internal pressure is supplied from the fluid source into the tire T through the internal pressure passage 62, the through hole 53, the spring chamber 51 and the passage 58. At this time, receiving the supplied internal pressure, the second piece 13 is slightly moved in the direction to pull out of the first piece 12, by which the upper end of each of the claws 31 is fitted to the shallow recess 38 formed on the claw 21.

Also, at this time, since the internal pressure is supplied to the spring chamber 66 through the branch passage 65, an upward moving force (fluid force) is applied to the slider 42, and the slider 42 is moved upward along the guide shaft 41 against the return spring 47. As a result, the enlarging member 44 is enlarged outside in the radial direction by the wedge action of the tapered surfaces 42a, 44a, by which the cylindrical part 26 of the second piece 13 at the overlapped region 34 is pushed by the enlarging member 44 and slightly expanded radially outward. As a result, the cylindrical part 26, more particularly the outer circumference of the claw 31, is brought into close contact with the inner circumference 16a of the cylindrical part 16, and the concentricity of the first piece 12 and the second piece 13 is improved.

Next, when the opening/closing rod 63 is lowered, the valve body 54 is pressed against the valve seat surface of the through hole 53 by the energizing force of the spring 56, and the valve 50 is closed. After that, the tire T filled with the internal pressure by the conveying device and the first and the second pieces 12, 13 combined with each other are integrally conveyed to an inspection station. At this time, since the valve 50 is closed as mentioned above, the internal pressure in the tire T is kept filled, and leakage to the outside is prevented.

After that, the tire T and the rim 11 are loaded onto an inspecting device installed at the inspection station, the supporting member 60 of a uniformity inspecting device, for example, and the cylindrical part 16 of the first piece 12 is inserted into the insertion hole 61. In this state, the opening/closing rod 63 of the inspecting device is raised to open the valve 50 and to supply the internal pressure into the tire T, and uniformity of the tire T is inspected while rotating the supporting member 60, the tire T and the rim 11. At this time, a relative rotational force acts between the first piece 12 and the second piece 13, but since the claw 31 is fitted to the shallow recess 38 as mentioned above, such a situation as removal of fastening between the first and the second pieces 12, 13 is prevented.

When the inspection of the tire T is finished in this way, the opening/closing rod 63 of the inspecting device is lowered to close the valve 50, and then, the tire T and the rim 11 is conveyed integrally from the inspection station to the rim disassembly station, and the first piece 12 is loaded on the supporting member 60 of a rim disassembling device. After that, the opening/closing rod 63 of the rim disassembling device is raised to open the valve 50, and the internal pressure in the tire T and the spring chamber 66 is exhausted. By this, the slider 42 is pushed downward by the energizing force of the return spring 47 and returned to the initial position, while the enlarging member 44 is contracted to the inside in the radial direction and also returned to the initial position.

Next, after the second piece 13 is gripped by the gripping mechanism 69 of the conveying device, the second piece 13 is relatively rotated only by 45 degrees with respect to the first piece 12, and the claw 31 is positioned at the clearance 22 between the claws 21. After that, the second piece 13 is raised by the gripping mechanism 69, and the cylindrical part 26 is pulled out of the cylindrical part 16, but since the claw 31 passes through the clearance 22 at this time, too, the claws 21, 31 do not interfere with each other. After that, the tire T is taken out of the first piece 12 by the conveying device and conveyed to the next process, while the opening/closing rod 63 of the rim disassembling device is lowered to close the valve 50.

After the second piece 13 is lowered again by the gripping mechanism 69 and the cylindrical part 26 is inserted into the cylindrical part 16, the second piece 13 is relatively rotated only by 45 degrees with respect to the first piece 12, and the first piece 12 and the second piece 13 are fastened together. After that, by gripping the upper second piece 13, the rim 11 is suspended and conveyed by the conveying device to a storage station.

On this occasion, since the tire T filled with internal pressure is not attached to these first and the second pieces 12, 13, the both pieces 12, 13 are relatively rotated easily, and there may occur removal and drop of the first piece 12 from the second piece 13. However, since the upper end of the claw 31 is fitted to the shallow recess 38 of the claw 21, respectively, as mentioned above, relative rotation of the first and the second pieces 12, 13 is blocked, and removal of fastening between the both pieces 12, 13 is prevented.

It will be appreciated from the foregoing description that the present invention provides a split rim to which a pneumatic tire with a different inter-bead distance can be easily attached. It is needless to say that the present invention is not limited to the illustrated embodiment, and many variations may be made without deviating from the scope of the invention.

For example, in the above-mentioned embodiment, the first piece 12 is made as the lower side and the second piece 13 as the upper when the first and the second pieces 12, 13 are combined, though the vertical relation between the first and the second pieces may be reversed.

Also, in the above-mentioned embodiment, uniformity of the tire T is inspected at the inspection station, though such inspection stations may be installed in plural so that the tire T and the rim 11 are conveyed sequentially to these inspection stations to sequentially take various inspections, such as a balance inspection, for example.

Moreover, in the above-mentioned embodiment, on the lower face of the claw 21 of the first piece 12 located on the lower side, the shallow recess 38 is formed so as to fit the claw 31 of the second piece 13 located on the upper side, though it is possible to form a shallow recess on the upper face of the claw of the piece located on the upper side, so as to fit the claw of the piece located on the lower side. In this case, when conveying a rim to which a tire is not attached as yet, the conveyance may be done while supporting the lower piece from the lower side.

Also, in the above-mentioned embodiment, the valve 50 is provided on the first piece 12 located on the lower side, though it may be provided on the second piece located on the upper side.

The invention claimed is:

1. A split rim for a pneumatic tire, comprising a disk part having a seat portion allowing one of bead portions of a pneumatic tire to be seated at an outer end in the radial direction, and first and second pieces having cylindrical parts coaxially connected to the disk part, respectively, wherein the cylindrical parts of the first and the second pieces can be inserted into each other, and a fastening means is further provided for fastening the cylindrical parts of the first and the second pieces overlapped in the inserted state to each other at their overlapped region, wherein the split rim for the pneumatic tire further comprises an expanding means for expanding the cylindrical part of the second piece in the overlapped region radially outward so that the cylindrical parts of the first piece and the second piece are brought into close contact with each other at the overlapped region, the expanding means including a guide shaft coaxial with the center shaft of the cylindrical part of the first piece, a slider fitted to the outside of the guide shaft movable in the axial direction of the guide shaft and having a tapered surface made of a part of a conical surface on the outer circumference, and an enlarging member with the inner circumference which can be engaged with the tapered surface of the slider and the outer circumference which can be engaged with the inner circumference of the cylindrical part of the second piece, respectively, the cylindrical part of the second piece at the overlapped region being expanded radially outward by moving the slider in the axial direction and by enlarging the enlarging member outward in the radial direction by a wedge action of the tapered surface.

2. The split rim according to claim 1, further comprising a closure lid for closing an opening on the side separated from the overlapped region of the cylindrical parts of the first and the second pieces.

3. The split rim according to claim 2, further comprising a valve which can be opened/closed, which is provided at the closure lid of the first or the second piece and the internal pressure is supplied to the tire by opening the valve only when a rim to which a pneumatic tire is attached is conveyed to a predetermined position.

4. The split rim according to claim 1, wherein, among the first and the second pieces, an inclined surface tapered downward is provided on the outer circumference of the cylindrical part of the piece to be on the lower side when combined with each other so that positioning is achieved using the inclined surface when a rim to which a pneumatic tire is attached is loaded on a predetermined position.

5. A split rim for a pneumatic tire, comprising a disk part having a seat portion allowing one of bead portions of a pneumatic tire to be seated at an outer end in the radial direction, and first and second pieces having cylindrical parts coaxially connected to the disk part, respectively, wherein the cylindrical parts of the first and the second pieces can be inserted into each other, and a fastening means is further provided for fastening the cylindrical parts of the first and the second pieces overlapped in the inserted state to each other at their overlapped region, wherein:

the fastening means comprises a first fastening mechanism in which a group of claws made of a plurality of claws formed on the inner circumference of the cylindrical part of the first piece and arranged with an equiangular interval in the circumferential direction are provided in plural stages in the axial direction separated by an equal distance, and a second fastening mechanism in which a group of claws made of a plurality of claws formed on the outer circumference of the cylindrical part of the second piece and separated by an equal angle from the claw in the circumferential direction are provided in plural stages in the axial direction separated by the equal distance as above claw, and by inserting the cylindrical part of the second piece into the cylindrical part of the first piece, after the claws of the second fastening mechanism pass between the claws of the first fastening mechanism, the first and the second pieces being relatively rotated, and by having the claws of the first and the second fastening mechanisms overlapped with each other, the cylindrical parts of the first and the second pieces are fastened, and a shallow recess is formed on one of the claws of the first fastening mechanism or the claws of the second fastening mechanism and the other of the claws fits into the recess when the claws are combined with each other.

* * * * *